United States Patent
Marchini et al.

(10) Patent No.: US 10,730,258 B2
(45) Date of Patent: Aug. 4, 2020

(54) PROCESS AND APPARATUS FOR BUILDING TYRES FOR VEHICLE WHEELS

(71) Applicant: PIRELLI TYRE S.P.A., Milan (IT)

(72) Inventors: Maurizio Marchini, Milan (IT); Gaetano Lo Presti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 551 days.

(21) Appl. No.: 15/663,966

(22) Filed: Jul. 31, 2017

(65) Prior Publication Data
US 2017/0326825 A1 Nov. 16, 2017

Related U.S. Application Data

(62) Division of application No. 13/132,302, filed as application No. PCT/IB2008/055050 on Dec. 2, 2008, now Pat. No. 9,789,658.

(51) Int. Cl.
| | |
|---|---|
| *B29D 30/26* | (2006.01) |
| *B29D 30/24* | (2006.01) |
| *B29D 30/30* | (2006.01) |

(52) U.S. Cl.
CPC .......... *B29D 30/245* (2013.01); *B29D 30/248* (2013.01); *B29D 30/3028* (2013.01); *B29D 2030/2671* (2013.01)

(58) Field of Classification Search
CPC ............... B29D 30/245; B29D 30/248; B29D 30/3028; B29D 2030/2671; B29D 2030/2685; B29D 2030/2692; B29D 2030/2678
See application file for complete search history.

(56) References Cited

U.S. PATENT DOCUMENTS

| | | | |
|---|---|---|---|
| 2,045,545 | A | 6/1936 | Shook |
| 4,138,307 | A | 2/1979 | Rost |
| 4,504,337 | A | 3/1985 | Askam et al. |
| 5,250,142 | A | 10/1993 | Weimer et al. |
| 5,354,405 | A | 10/1994 | Byerley |
| 5,445,695 | A | 8/1995 | Ozawa et al. |

(Continued)

FOREIGN PATENT DOCUMENTS

| | | |
|---|---|---|
| DE | 213170 A | 9/1984 |
| JP | 5 -220865 | 8/1993 |

(Continued)

OTHER PUBLICATIONS

Search Report, Brazilian Patent and Trademark Office, dated Sep. 3, 2018.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

An apparatus for building a tyre for a vehicle wheel includes a building drum having at least one first outer circumferential surface, and at least one pair of auxiliary support members removably in engagement with the building drum, each in axial side by side relationship with a respective end of the building drum and having second outer circumferential surfaces extending in the continuation of the first outer circumferential surface so as to support at least one component of the tyre. Each of the second outer circumferential surfaces has at least one non-stick circumferential portion and at least one sticking circumferential portion.

17 Claims, 6 Drawing Sheets

(56) References Cited

U.S. PATENT DOCUMENTS

| 6,328,084 | B1 | 12/2001 | Caretta et al. |
|---|---|---|---|
| 6,363,989 | B1 | 4/2002 | Phelps et al. |
| 6,390,166 | B1 | 5/2002 | Roberts et al. |
| 2005/0145314 | A1 | 7/2005 | Ikeda et al. |
| 2005/0224159 | A1 | 10/2005 | Suda et al. |
| 2005/0279444 | A1 | 12/2005 | Latieyre et al. |

FOREIGN PATENT DOCUMENTS

| JP | 09-193259 | 7/1997 |
|---|---|---|
| JP | 2002-172709 | 6/2002 |
| JP | 2007-62083 | 3/2007 |
| JP | 2010-524741 A | 7/2010 |
| WO | WO 2001/89819 A1 | 11/2001 |
| WO | WO 2008/099236 | 8/2008 |
| WO | WO 2008/129363 A1 | 10/2008 |

OTHER PUBLICATIONS

English-language translation of JP 2002-172709, which was published Jun. 18, 2002.
Notice of Preliminary Rejection in Application No. 10-2011-7012482, Korean Intellectual Property Office, dated Feb. 13, 2015.
Office Action and Notice of Reasons for Rejection in Application No. 2014-000453, Japanese Patent Office, dated Feb. 23, 2015.
Decision of Rejection dated Sep. 2, 2013, by Japanese Patent Office in corresponding Application No. JP 2011-538063 (3 pages).
Office Action dated Feb. 4, 2013, in Japanese Application No. 2011-538063.
International Search Report from the European Patent Office for International Application No. PCT/IB2008/055050 (dated Aug. 24, 2009).
Machine translation of JP 2002-172709, patent document published Jun. 18, 2002.

PROCESS AND APPARATUS FOR BUILDING TYRES FOR VEHICLE WHEELS

CROSS REFERENCE TO RELATED APPLICATION

This application is a divisional application of U.S. patent application Ser. No. 13/132,302, filed Jun. 1, 2011, which is a U.S. national phase entry under 35 U.S.C. § 371 of International PCT Application No. PCT/IB2008/055050, filed Dec. 2, 2008, the content of all of which are incorporated herein by reference.

BACKGROUND

Field

The present invention relates to a process and an apparatus for building tyres for vehicle wheels.

More particularly, the invention applies to the process and equipment used for building a green tyre, to be subsequently submitted to a vulcanisation cycle for obtaining the final product.

Description of the Related Art

A tyre for vehicle wheels generally comprises a carcass structure including at least one carcass ply having respectively opposite end flaps in engagement with respective annular anchoring structures, integrated into the regions usually identified as "beads", and having an inner diameter substantially corresponding to a so-called "fitting diameter" of the tyre for mounting on a respective rim.

Associated with the carcass structure is a belt structure comprising one or more belt layers, arranged in radially superposed relationship with respect to each other and to the carcass ply and having textile or metallic reinforcing cords with a crossed orientation and/or substantially parallel to the circumferential extension direction of the tyre. Applied at a radially external position to the belt structure is a tread band, of elastomeric material too, like other semifinished products constituting the tyre.

Respective sidewalls of elastomeric material are also applied at an axially external position, to the side surfaces of the carcass structure, each extending from one of the side edges of the tread band until close to the respective annular anchoring structure to the beads. In tyres of the "tubeless" type, an air-tight coating layer usually referred to as "liner" covers the inner surfaces of the tyre.

Subsequently to building of the green tyre carried out through assembly of the respective components, a vulcanisation and moulding treatment is generally performed which aims at determining the structural stabilisation of the tyre by cross-linking of the elastomeric compounds and also at impressing the same with a desired tread pattern and with possible distinctive graphic marks at the sidewalls.

The carcass structure and belt structure are generally made separately from each other in respective work stations, to be mutually assembled at a later time.

In document WO2008/099236 in the name of the same Applicant, a carcass ply is applied around an outer surface of a building drum, according to an application diameter greater than the fitting diameter of the tyre. Auxiliary support members, made in the form of two annular elements for example, can be removably moved close to the building drum on axially opposite sides.

The auxiliary support members have respective rest surfaces preferably having a substantially cylindrical conformation of substantially the same diameter as the application diameter. The outer surface of the building drum has an axial size smaller than the width of the carcass ply, so that the end flaps of the carcass ply disposed on the building drum axially protrude from the opposite ends of the outer surface and are at least partly supported by the aforesaid rest surfaces. When formation of the carcass ply/plies has been completed, the auxiliary support members are axially moved away from the respective halves of the building drum, so that the rest surfaces can be removed from the carcass ply/plies and from other possible components applied thereto. Removal of the rest surfaces makes it possible to fold down the end flaps of the carcass ply/plies applied around the building drum, towards the geometric axis of said building drum. An annular anchoring structure defining the fitting diameter is coaxially engaged around each of the end flaps. An outer sleeve comprising at least one belt structure possibly associated with a tread band is disposed at a coaxially centred position around the carcass sleeve applied onto the building drum. Through axial approaching of the two halves forming the building drum, the carcass sleeve is shaped into a toroidal configuration to cause application of same against a radially internal surface of the outer sleeve.

In the technological context in which the Applicant has to operate, an increase in the daily productivity is often required for tyres that are different from each other in size and structure, while a high operating flexibility in the production is to be maintained.

More specifically, in this context by operating flexibility it is intended the possibility of using, for each tyre, elementary components that are different from each other in terms of type of elastomeric material or type of textile or metallic reinforcing cord.

In the present specification and in the following claims, by the term "elementary components" it is intended to denote continuous elongated elements of elastomeric material, rubberised textile and/or metallic cords, strip-like elements. To the aims of the present specification and the subsequent claims, it is to be pointed out that "strip-like element" means a strip of elastomeric material cut to size and comprising one or more textile or metallic reinforcing cords that are mutually parallel or crossed.

In the present specification and in the following claims by "component" of a tyre it is intended any part of the tyre or a portion thereof that is adapted to perform a function. For instance, intended as tyre components are the liner, underliner, abrasion-proof element, bead core, bead filler, carcass ply, belt layer, belt underlayer, tread underlayer, under-belt inserts, sidewall inserts, sidewalls, tread band, reinforcing inserts.

In this context the Applicant has verified that an excellent quality of the product can be achieved by manufacturing the whole green tyre without removing the carcass structure from the building drum, as described in the above mentioned document WO2008/099236.

SUMMARY

The Applicant has however noticed that during building of the carcass structure a "belting" force is generated on the aforesaid support members which is due to laying by spiraling of one or more continuous elongated elements of elastomeric material for example forming the liner, underliner, abrasion-proof element or other tyre components made of elastomeric material alone. It is the Applicant's opinion that this phenomenon takes place because during laying of the continuous elongated element on the respective support member, this continuous elongated element is pulled and deformed in an elastic manner along its longitudinal extension and laid in this deformed configuration on the support member which inhibits it from recovering its original configuration. The length of the continuous elongated element along the peripheral extension of the support member is therefore greater than the length of said continuous elongated element in its original configuration. The tyre components thus formed radially clench the support member, exerting said "belting" force thereon.

This force makes it difficult to carry out said operation of moving the support members away for going on building of the carcass structure comprising at least turning up of at least one carcass ply built on the building drum, which difficulty can also give rise to tearing of the materials laid on the building drum, which will inevitably bring about discarding of the tyre being processed.

The Applicant has also observed that the presence of a non-stick surface on said support members, while solving the above mentioned problem, would make laying of said continuous elongated elements of elastomeric material very complicated within the automated scope of the aforesaid technological context. In fact, the laying cycle must often begin by sticking the head of the continuous elongated element to the support member but this adhesion cannot take place if said surface has anti-sticking properties.

The non-stick surface of the support members would also make laying of other components such as the so-called "square woven fabric" very complicated. These components, obtained from a strip-like element comprising a plurality of mutually crossed cords buried in a layer of elastomeric material, do not show particular stickiness and are completely laid axially externally of the building drum, i.e. integrally on said support members. These components without a manual intervention would be unable to remain in place during their application onto said non-stick surface.

In the present specification and in the claims "non-stick portion" means such a surface portion that an elementary component resting thereon does not stick on said surface portion and in addition can tangentially slide thereon without generation of frictional forces that may cause tearing or deformations capable of modifying the geometry of the elementary component and consequently of the tyre component formed therefrom, out of the design parameters. For instance, these surfaces are those on which an added non-stick material such as "Teflon®" for example is laid, using a technology known in itself as "plasma coating", for example.

By "sticking portion" in the present specification and in the claims it is intended a surface portion that is not provided with the above described features. At these sticking portions, the aforesaid elementary component laid thereon remains in place being at least temporarily stuck on the portion itself. The sticking portions in accordance with the present invention are therefore of such a nature relative to the elastomeric material coming into contact with them, such as the mechanically machined metal surfaces that are in no way treated or the metal base surfaces on which other (preferably metallic) material has been added which has mechanical surface features (roughness, porosity, hardness) substantially identical with those of the base surface.

The Applicant has then realised that, by forming sticking portions and non-stick portions on the outer circumferential surface of each of the support members, it would have been possible to build any tyre component thereon, avoiding both the effect due to the belting force and the problems resulting from the reduced stickiness of some elementary components.

More particularly, the Applicant has found that, by making the surface of these support members non-stick except for at predetermined circumferential portions, it is possible to correctly build any tyre component and easily decouple said circumferential rest surface from the tyre components built thereon, irrespective of the structure of said components, without damaging the latter or other portions of the tyre being processed.

More specifically, in a first aspect the present invention relates to a process for building tyres for vehicle wheels, comprising the steps of:

i) providing a building drum having a first outer circumferential surface;

ii) engaging auxiliary support members with the building drum, each support member being in axially approached relationship with an axial end of the building drum, said support members each having a second outer circumferential surface extending in the continuation of said first outer circumferential surface;

wherein said second outer circumferential surface has at least one non-stick circumferential portion and at least one sticking circumferential portion;

iii) applying at least one tyre component around at least said second outer circumferential surface, said tyre component lying partly on said non-stick circumferentially portion and partly on said sticking circumferential portion;

iv) axially moving said auxiliary support members away from said building drum.

In a further aspect, the invention relates to an apparatus for building tyres for vehicle wheels, comprising:

a building drum having at least one first outer circumferential surface;

at least one pair of auxiliary support members to be removably engaged with the building drum, each in axially approached relationship with a respective end of the building drum, and having second outer circumferential surfaces extending in the continuation of said first outer circumferential surface for supporting at least one tyre component;

wherein each of the second outer circumferential surfaces has at least one non-stick circumferential portion and at least one sticking circumferential portion.

The Applicant has verified that the process and apparatus in accordance with the invention enable to draw the auxiliary support members out of the tubular ends of the carcass sleeve already partially formed on the building drum, without the friction between the second outer circumferential surface and the radially internal portions of said tubular ends, lying in contact with said second outer circumferential surface, generating forces capable of damaging the carcass sleeve being formed.

In addition, the sticking portions allow the elementary components to be stuck and maintained in place during the starting steps of laying said components on the support members and therefore enable correct laying of all the tyre components.

The present invention, in at least one of the above aspects, can have one or more of the preferred features hereinafter described.

In accordance with an embodiment of the process, step iii) comprises the steps of:

iii') sticking one starting end of a strip-like element onto the sticking circumferential portion, and iii″) winding said strip-like element on said second outer circumferential surface.

Said strip-like element can be the so-called "square woven fabric" which is formed with crossed cords coated with elastomeric material, is used as a reinforcing element for the bead aiming at making the bead area stiffer, and is above all although not exclusively utilised in tyres of the racing type. Said strip-like element can also consist of other reinforcing strip-like elements of different texture.

According to an alternative embodiment, step iii) comprises the steps of:

iii‴) sticking one starting end of a continuous elongated element of elastomeric material onto the sticking circumferential portion, and iii$^{iv}$) laying said continuous elongated element of elastomeric material into coils disposed in side by side relationship or in at least partly overlapped relationship on said second outer circumferential surface.

Different types of elongated elements are used for example for forming the abrasion-proof element and/or liner and/or underliner, on the drum and/or the auxiliary support members.

Preferably, the continuous elongated element of elastomeric material is laid at least partly on the strip-like element.

In fact the abrasion-proof element and liner/underliner are superposed over the "square woven fabric".

Preferably, said sticking circumferential portion is a first sticking circumferential portion close to the building drum.

Preferably, during said step iii), said at least one tyre component is fully laid on said second outer circumferential surface. This situation in particular can occur during laying of the "square woven fabric" and the abrasion-proof element.

The present invention therefore allows the continuous elongated element and/or strip-like elements and/or further elementary reinforcing components to be correctly laid down, because during laying, adhesion of these components to the second outer circumferential surface is ensured and at the same time separation of the already laid elongated element from said second outer circumferential surface is allowed without running the risk of damaging the partly formed carcass sleeve.

In particular, the present invention prevents the adhesion between the abrasion-proof element and the second outer circumferential surface from causing stretching in the axial direction of the end flaps of the partly formed carcass sleeve, during removal of the auxiliary support members. The Applicant has ascertained that in the absence of non-stick portions, this situation becomes particularly critical. In fact, if for instance the square woven fabric is not present and the abrasion-proof element adheres to the first outer circumferential surface of the building drum for a portion thereof, and for the remaining portion directly adheres to the second circumferential surface of the auxiliary members that are devoid of non-stick portions, the pulling action exerted by the auxiliary support members during the removal step tends to separate the coils adhering to the first outer circumferential surface of the building drum from the coils adhering to the second circumferential surface of said auxiliary members.

Therefore, the present invention allows tyres to be manufactured that are different from each other in terms of structure and materials of the beads, e.g. with or without the square woven fabric, with the abrasion-proof element fully disposed on the second outer circumferential surface or partly disposed on the second outer circumferential surface and partly on the first outer circumferential surface of the building drum, thus improving both the production and qualitative aspects of the obtained products.

Preferably, step iii) comprises the step of laying a plurality of strip-like elements disposed in succession along the circumferential extension of said first outer circumferential surface so as to form at least one carcass ply, said step comprising the step of applying end flaps of each strip-like element onto the sticking circumferential portion.

Preferably, said sticking circumferential portion is a 10 second sticking circumferential portion axially spaced apart from the building drum.

This solution is particularly advantageous where two heads are used for laying the strip-like elements of the carcass ply, one head being disposed over the building drum and one under it. The ends of the first strip-like elements laid on the lower portion of the drum are retained in place and do not fall down by effect of gravity exactly due to the stickiness offered by said second circumferential portions.

Preferably, in said step iii) said second outer circumferential surface has a greater diameter than the fitting diameter.

Preferably, said step iv) is followed by a step v) in which a pair of annular anchoring structures defining the fitting diameter is applied to the end flaps of said at least one carcass ply.

Preferably, between said step iv) and step v) a step vi) is carried out in which the end flaps of said at least one carcass ply are folded down towards a geometric rotation axis of the building drum.

Step iv) is carried out by applying a moving-apart force included between about 10 kg and about 150 kg to each of said auxiliary support members.

Preferably, step iv) is carried out by applying a moving-apart force smaller than or equal to about 100 kg to each of said auxiliary support members.

Preferably, said at least one non-stick circumferential portion and at least one sticking circumferential portion are disposed in axial side by side relationship with each other.

In addition, preferably each of the second outer circumferential surfaces has a first sticking circumferential portion close to a first axial end of the auxiliary support member.

According to a preferred embodiment, each of the second outer circumferential surfaces has a second sticking circumferential portion close to a second axial end of the auxiliary support member opposite to said first axial end.

Preferably, each of the second outer circumferential surfaces has a first non-stick circumferential portion placed on a first axial end of the auxiliary support member.

In addition, preferably, each of the second outer circumferential surfaces has a second non-stick circumferential portion placed on a second axial end of the auxiliary support member opposite to the first axial end.

Preferably, the first sticking circumferential portion and the second sticking circumferential portion are separated by a third non-stick circumferential portion.

Sticking portions located at axially distinct points of the support members allow elementary components that are to be placed at different regions of the tyre beads to be held in place, during laying.

In more detail, applied to the first sticking circumferential portion are, for instance, the elementary components designed to form the abrasion-proof element, liner, underliner, square woven fabric.

Applied to the second sticking circumferential portion are, for instance, the ends of the strip-like elements designed to form the carcass ply/plies.

According to a preferred embodiment, the first sticking circumferential portion has an axial width smaller than or equal to about 35% of an overall axial width of the auxiliary support member.

In addition, preferably, the first sticking circumferential portion has an axial width greater than or equal to about 20% of an overall axial width of the auxiliary support member.

In accordance with a preferred embodiment, the second sticking circumferential portion has an axial width smaller than or equal to about 15% of an overall axial width of the auxiliary support member.

In addition, preferably, the second sticking circumferential portion has an axial width greater than or equal to about 5% of an overall axial width of the auxiliary support member.

In accordance with a preferred embodiment, the first non-stick circumferential portion has an axial width smaller than or equal to about 15% of an overall axial width of the auxiliary support member.

In addition, preferably, the first non-stick circumferential portion has an axial width greater than or equal to about 5% of an overall axial width of the auxiliary support member.

In accordance with a preferred embodiment, the second non-stick circumferential portion has an axial width smaller than or equal to about 35% of an overall axial width of the auxiliary support member.

The choice of the size and location of the sticking portions and non-stick portions allows tyres with different structures to be built. In addition, for building tyres of same sizes, it is sufficient to replace the auxiliary support members alone.

Preferably, said at least one non-stick circumferential portion has a roughness smaller than or equal to about 12 µm.

The present roughness Ra is the arithmetical average value of the deviations of the real profile of the surface from the centre line.

These values are the preferred ones in order to reduce adhesiveness as much as possible and increase sliding of the tyre components on the non-stick portions, allowing easy withdrawal of the auxiliary support members.

To this aim, preferably, said at least one non-stick circumferential portion comprises a non-stick coating obtained by plasma coating.

In addition, preferably, said at least one sticking circumferential portion has a roughness greater than or equal to about 12 µm.

Preferably, said at least one sticking circumferential portion has a roughness (Ra) smaller than or equal to about 15 µm.

These values are the preferred ones in order to give the surface the necessary stickiness to enable temporary adhesion of the elementary components during laying of same.

Preferably, said at least one non-stick circumferential portion and said at least one sticking circumferential portion delimit a step between them the thickness of which is included between about 5 µm and about 50 µm.

In addition, preferably, said thickness is thinner than or equal to about 20 µm.

The limited thickness of the step prevents the engagement of the tyre components directly in contact with the step itself during removal of the auxiliary support members from damaging the tyre and/or making removal difficult.

Further features and advantages will become more apparent from the detailed description of a preferred but not exclusive embodiment of a process and an apparatus for building tyres for vehicle wheels, in accordance with the present invention.

BRIEF DESCRIPTION OF THE DRAWINGS

This description will be set out hereinafter with reference to the accompanying drawings, given by way of non-limiting example, in which:

FIG. 3*a* is a further enlargement of FIG. 3;

DETAILED DESCRIPTION

Figure 1:
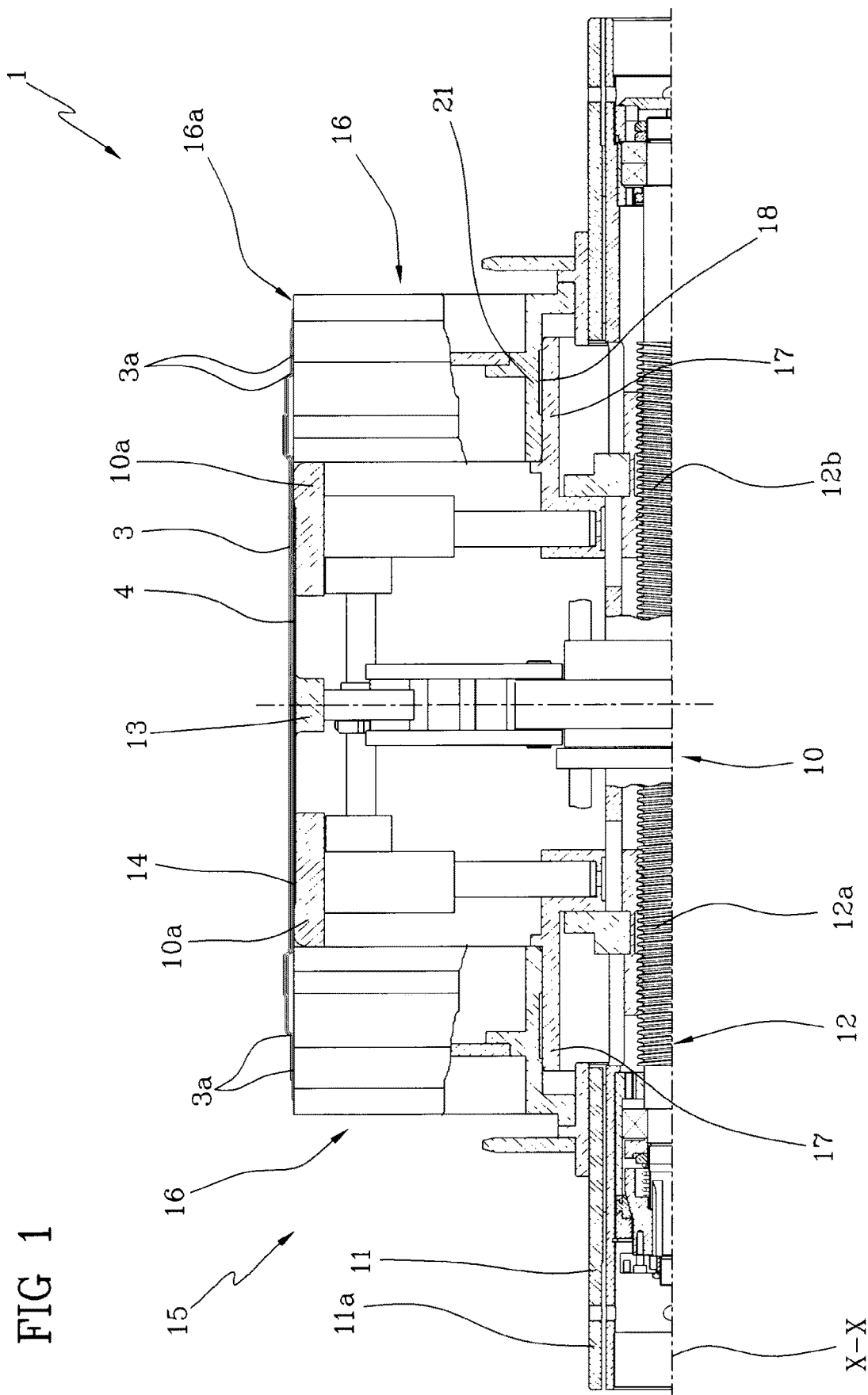
FIG. 1 diagrammatically shows, in diametrical section, a step of applying a carcass ply around a building drum provided with two auxiliary support members in accordance with the building process of the present invention.
Figure 2:
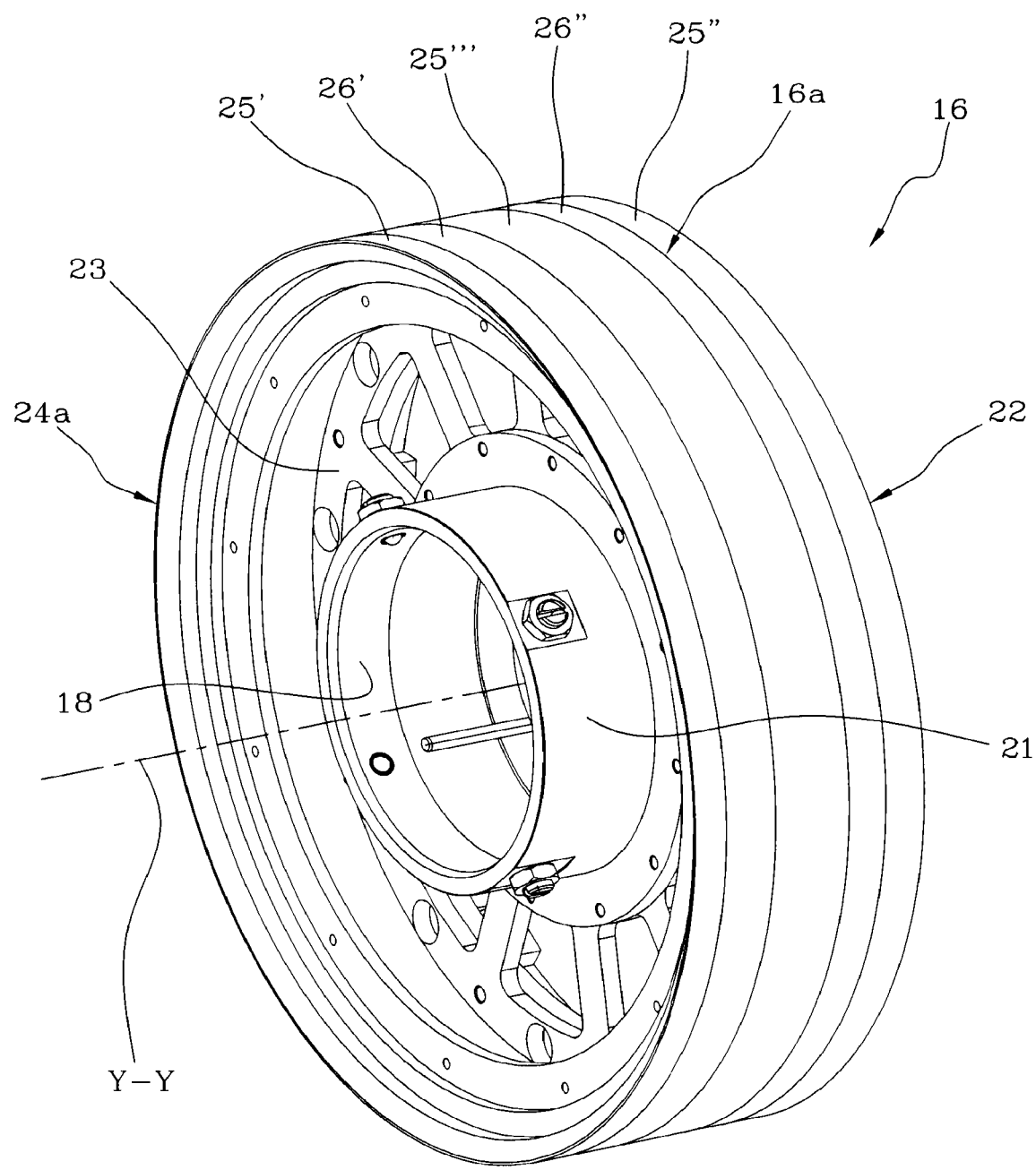
FIG. 2 is a perspective view to an enlarged scale relative to FIG. 1, of one of the auxiliary support members.
Figure 3:
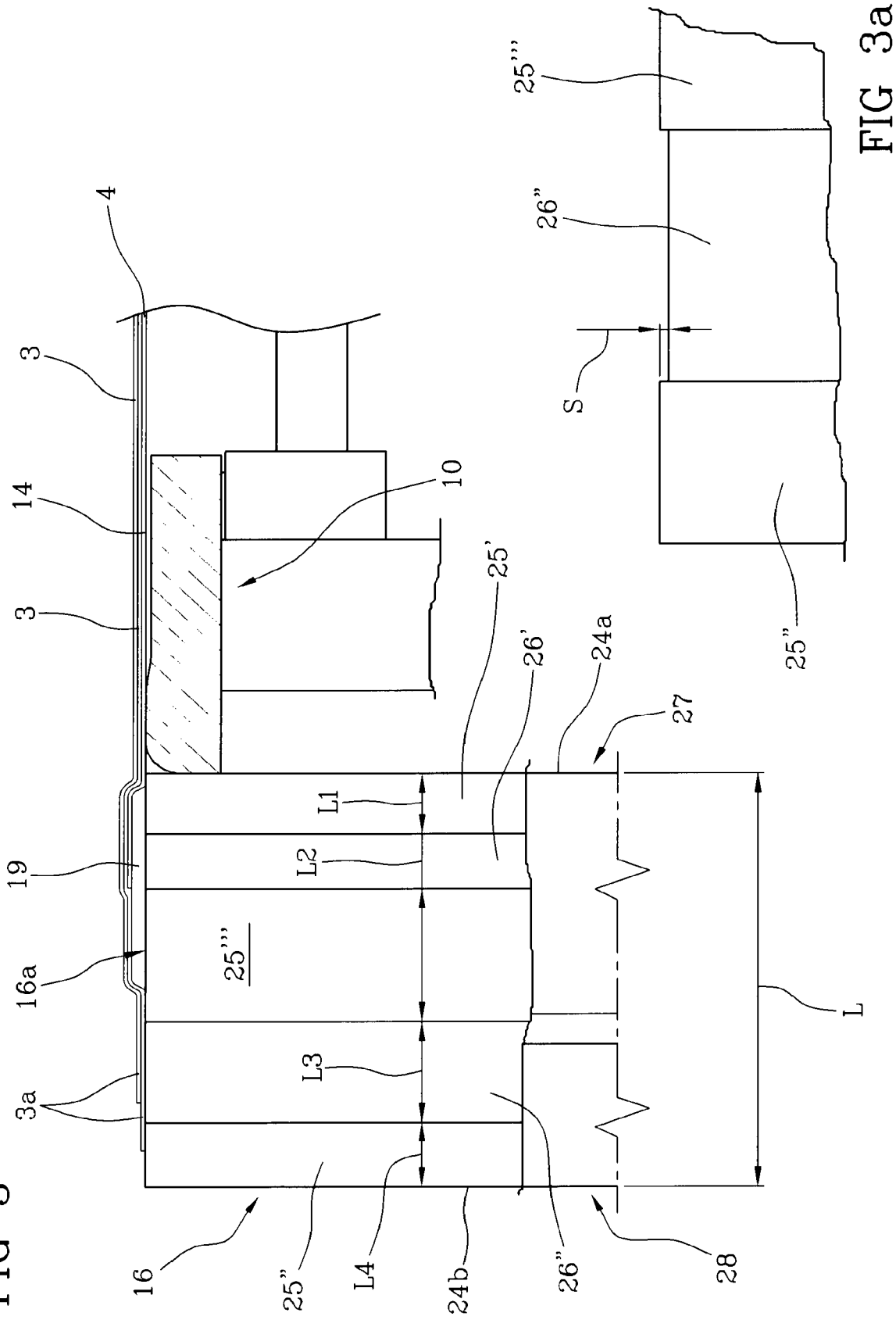
FIG. 3 shows an enlarged portion of one of the auxiliary support members seen in FIG. 1.

With reference to the drawings, an apparatus for building tyres for vehicle wheels designed to put into practice a process according to the present invention has been generally identified by reference numeral 1.

Figure 5:
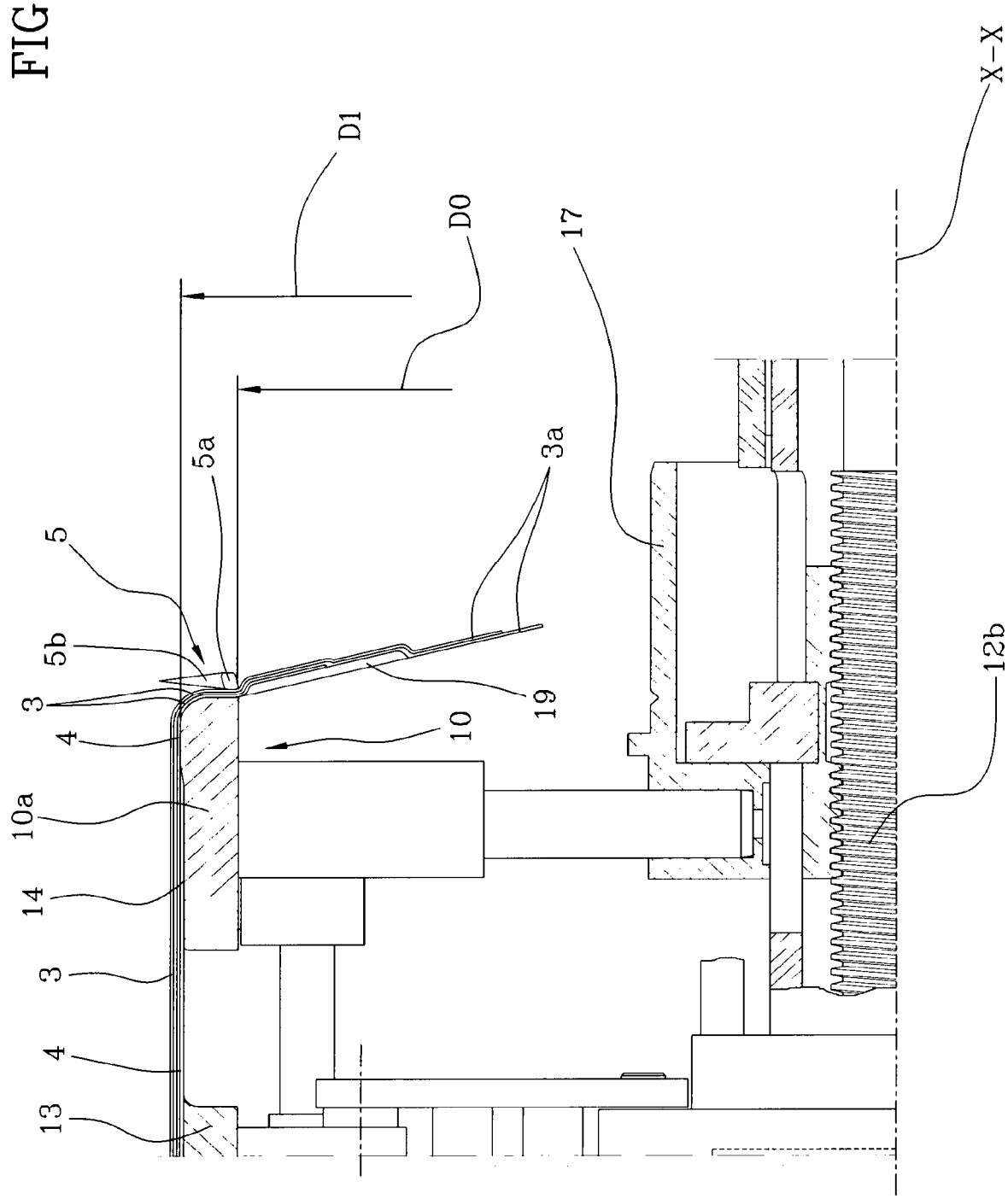
FIG. 5 shows to an enlarged scale relative to FIG. 1, a step in which annular anchoring structures are coaxially fitted on the respective end flaps of the carcass ply/plies.
Figure 6:
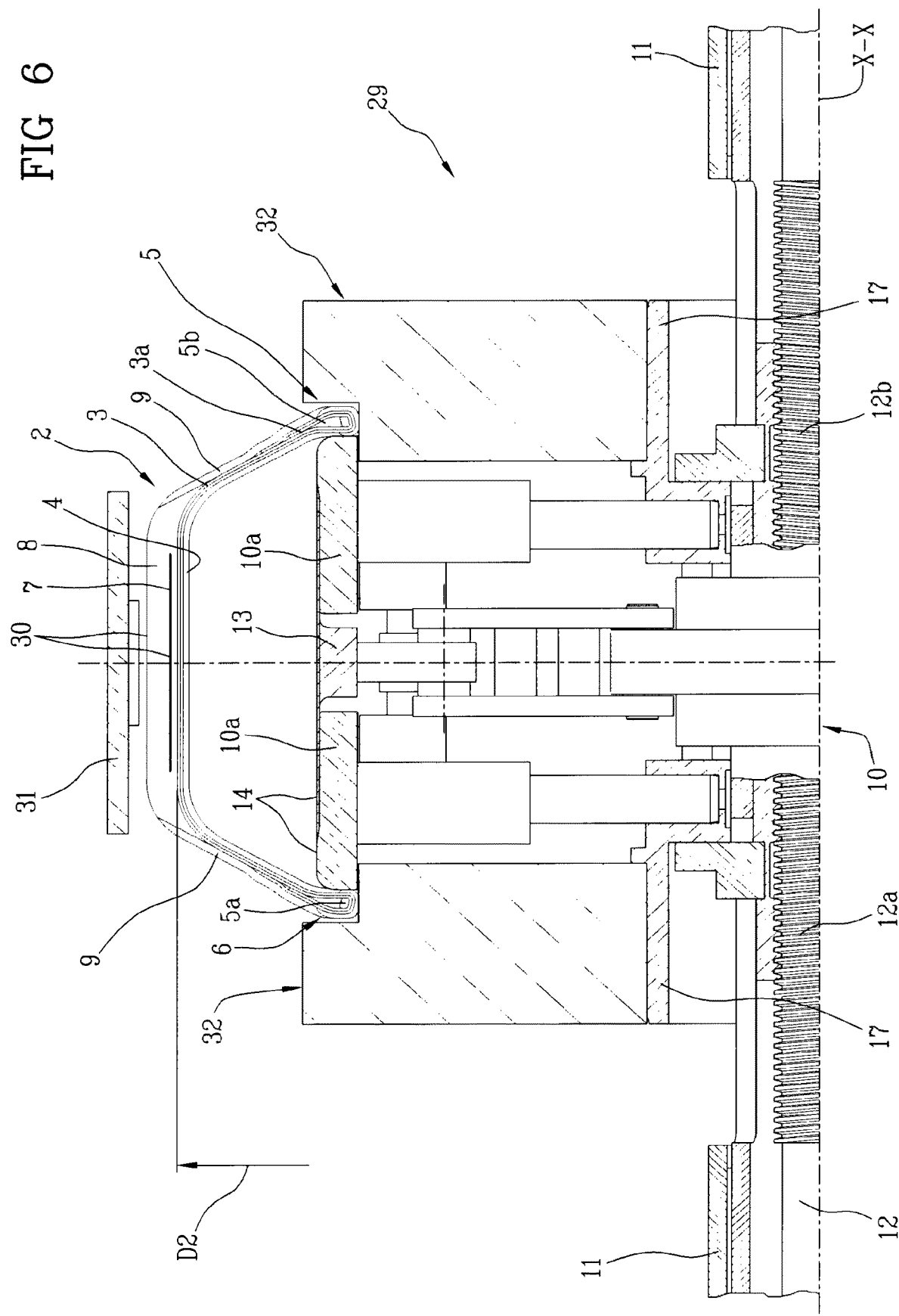
FIG. 6 shows a tyre being processed in the step during which the carcass sleeve is shaped for application of an outer sleeve thereto.

Apparatus 1 is intended for manufacture of tyres 2 (FIG. 6) essentially comprising at least one carcass ply 3 preferably internally coated with a layer of impermeable elastomeric material referred to as "liner" 4. Two annular anchoring structures 5, each comprising a so-called bead core 5*a* preferably carrying an elastomeric filler 5*b* at a radially external position, are in engagement with respective end flaps 3*a* of the carcass ply or plies 3. The annular anchoring structures 5 are integrated close to regions usually identified with the name of "beads" 6, at which usually engagement between a tyre 2 and the respective mounting rim (not shown) occurs, according to a fitting diameter "D0" determined by the inner diametrical sizes of the annular anchoring structures 5 (FIG. 5).

A belt structure 7 is circumferentially applied around the carcass ply/plies 3 and a tread band 8 circumferentially overlaps the belt structure 7. Two sidewalls 9, extending each from the corresponding bead 6 to a corresponding side edge of the tread band 8, are applied to the carcass ply/plies 3, at laterally opposite positions.

Apparatus 1 comprises a substantially cylindrical building drum 10 having two halves 10*a* supported by a central shaft 11 extending along a geometric axis "X-X" of the building drum 10. Halves 10*a* can be axially approached, upon command of a threaded bar 12 for example, that is operatively disposed within the central shaft 11 and carries two threaded portions 12*a*, 12*b*, i.e. a right-handed portion and a left-handed portion respectively, each of them engaging one of halves 10*a*. Halves 10*a* of the building drum 10 are consequently induced to simultaneously translate in respectively opposite directions along the central shaft 11, following rotations imparted to the threaded bar 12 by an actuator (not shown) that can be operatively coupled to one end of the central shaft 11.

The building drum 10 can further comprise a central section 13 slidably engaging halves 10*a* and extending in surface continuity relationship relative to said halves so as to define therewith, at a radially external position, a first outer circumferential surface 14 that is substantially continuous.

Each of halves 10a and the central section 13 are made up of respective circumferential sectors that are radially movable between a rest condition (not shown) at which they are moved radially close to the geometric axis "X-X" to give the building drum 10 an overall diametrical dimension smaller than the fitting diameter "D0" of the tyre being processed, in order to enable removal of the tyre 2 being processed from said building drum, and a work condition at which, as shown in the drawings, they extend in circumferential continuity relationship so as to form said outer surface 14 defining an application diameter "D1" preferably greater than the fitting diameter "D0" (FIG. 5).

The building drum 10 lends itself to be transferred, by at least one robotized arm (not shown) or transfer devices of other type acting on at least one grip end 11a exhibited by the central shaft 11, to one or more work stations to allow accomplishment of different working steps aiming at assembling the tyre 2 being processed.

More particularly, the building drum 10 for instance can be first engaged in a building station 15 (FIGS. 1 to 5) in which a so-called carcass sleeve is made, which comprises the carcass ply/plies coupled to the respective annular anchoring structures 5.

At least one outer handling device (not shown as made in known manner) carries out positioning of the auxiliary support members 16, made in the form of two annular elements for example (FIG. 2), in axially approached relationship with the building drum 10 on axially opposite sides.

The auxiliary support members 16 have respective second outer circumferential surfaces 16a preferably shaped into a substantially cylindrical conformation of substantially the same diameter as the application diameter "D1". When approaching has occurred, the second outer circumferential surfaces 16a extend in continuity relationship in the continuation of the first outer circumferential surface 14.

Engagement of the auxiliary support members 16 with the building drum 10 takes place at respective connecting members 17 carried by the building drum 10, made each in the form of a cylindrical sleeve for example, integrally carried by one of halves 10a of the building drum 10 and adapted to be operatively associated with an engagement seat 18 carried by the respective auxiliary support member 16.

Fitting elements, not shown, lend themselves to automatically engage the respective connecting members 17, so as to retain each auxiliary support member 16 in engagement relationship with the building drum 10 also after said members 17 have been disengaged from the aforesaid outer handling device.

The building drum 10 is thus adapted to be transferred, if necessary, between at least one first and one second work unit (not shown) provided in the building station 15, together with the auxiliary support members 16 linked thereto.

Operating in the building station 15 are auxiliary devices (not shown), adapted to apply components of the carcass sleeve to the building drum 10.

The carcass ply/plies 3 and/or other parts of tyre 2 are preferably made through laying of one or more elementary components. These elementary components are adapted to be used in a suitable amount in order to make up one or more of the above described constituent elements of the tyre, without storage of semifinished products being required.

In more detail, for instance these auxiliary devices may comprise one or more dispensing devices supplying at least one continuous elongated element of elastomeric material while the building drum 10 is being driven in rotation about its geometric axis "X-X", so as to form said liner 4 and/or underliner on the first outer circumferential surface 14 and the second outer circumferential surfaces 16a.

In addition or as an alternative to liner 4 and/or the underliner, the auxiliary devices can be set to form further components on the second outer circumferential surfaces 16a, such as the abrasion-proof element 19 to be incorporated at the beads 6, and/or to lay strip-like elements 20 forming reinforcing fabrics such as the square-woven fabric, and/or, in the case of the so-called run-flat tyres, to lay auxiliary support inserts made of elastomeric material alone (the so-called sidewall inserts) applied onto the respective halves 10a of the building drum 10, so that they are then incorporated at the inside of tyre 2 in the sidewall region 9.

As shown in FIGS. 1, 3, 5 and 6, before laying of liner 4, a continuous elongated element is laid in the form of coils disposed in side by side relationship or radially superposed internally of the second outer circumferential surface 16a, so as to form the abrasion-proof element 19.

According to an alternative construction of the carcass structure, not shown, the abrasion-proof element 19 is laid starting from the first outer circumferential surface 14 of drum 10 as far as the second outer circumferential surface 16a and therefore it lies astride the two above mentioned surfaces 14, 16a.

Figure 4:
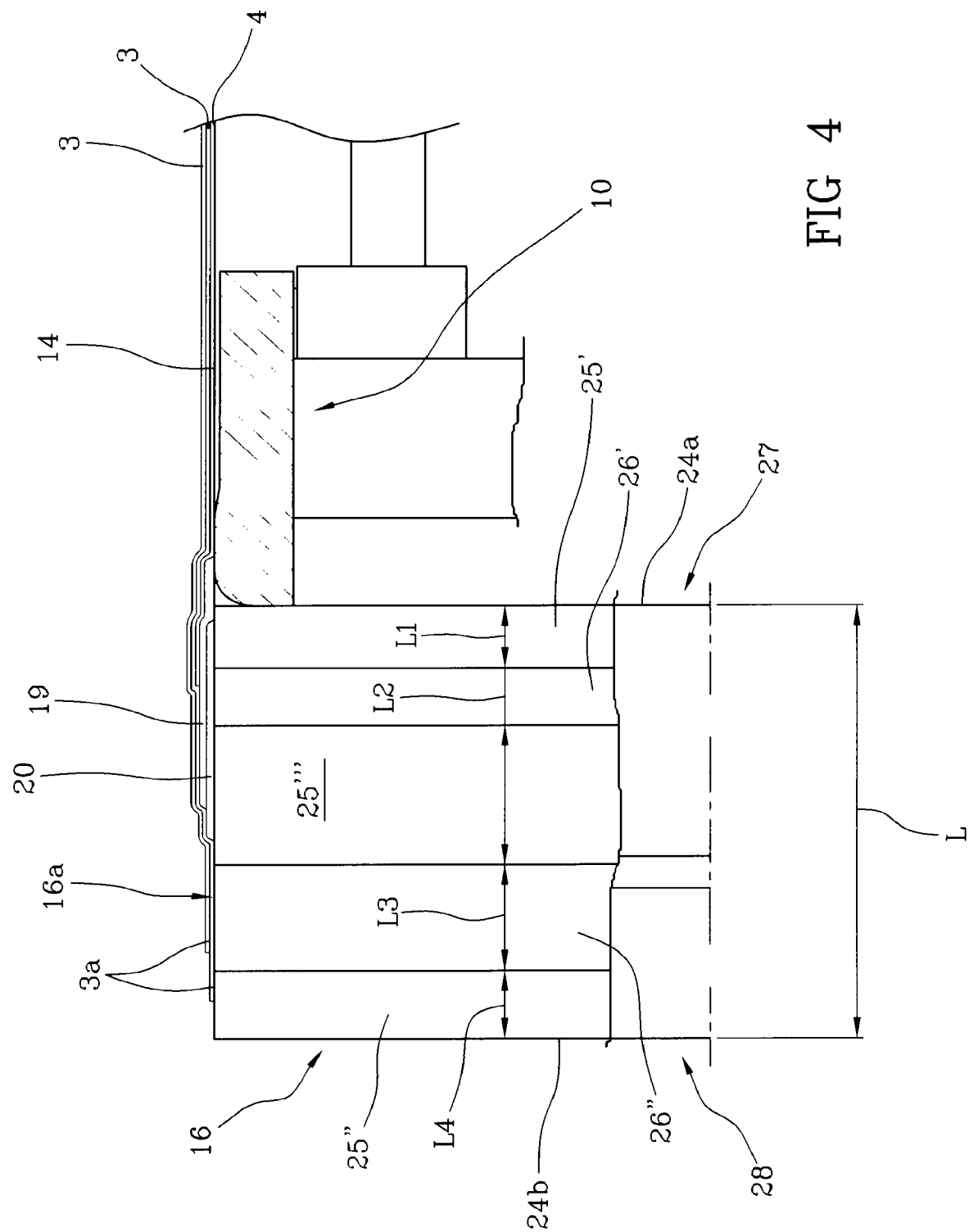
FIG. 4 shows the portion in FIG. 3 on which tyre components are laid, in accordance with an alternative embodiment of the building process according to the present invention.

As shown in FIG. 4, before laying of the abrasion-proof element 19, the strip-like element (forming the square-woven fabric) 20 is fully laid on the second outer circumferential surface 16a.

Subsequently to formation of the above-mentioned components 4, 19, 20, devices not shown as they can be made in any convenient manner, apply the carcass ply/plies 3 around the first outer circumferential surface 14, according to said application diameter "D1". Each carcass ply 3 can consist of an article of manufacture in the form of a continuous strip previously cut according to the circumferential extension of the first outer circumferential surface 14 and fed towards the latter, while the building drum 10 is rotating around its geometric axis "X-X", so as to cause winding of said strip around said first outer circumferential surface 14.

Alternatively, according to a preferred embodiment, the application devices comprise members for sequentially applying a plurality of strip-like elements disposed transversely of the circumferential extension of the first outer circumferential surface 14, while the building drum 10 is being driven in rotation in a step-by-step movement, in the same manner as described in the U.S. Pat. No. 6,328,084 in the name of the same Applicant, for example.

The carcass ply/plies 3 are then preferably formed directly on the building drum 10, by the strip-like elements applied in mutually approached relationship so as to cover the whole circumferential extension of the first outer circumferential surface 14.

Preferably, the first outer circumferential surface 14 has a smaller axial size than the width of said at least one carcass ply 3, so that the carcass ply/plies 3 laid on the building drum 10 axially protrudes/protrude from the opposite ends of the first outer circumferential surface 14 and appears/appear to be at least partly supported, together with liner 4 and/or the underliner and/or the abrasion-proof element 19 and/or the square-woven fabric 20, by the above mentioned second outer circumferential surfaces 16a belonging to the auxiliary support members 16.

In the embodiment shown in the accompanying drawings, each of the auxiliary support members 16 comprises a tubular body 21 delimiting the engagement seat 18 with the connecting member 17 carried by the building drum 10. When the auxiliary support member 16 is engaged to the building drum 10, the geometric axis "X-X" of the building drum 10 is coincident with the main axis "Y-Y" of the tubular body 21.

The auxiliary support member 16 further comprises a radially external cylindrical body 22, spaced apart from and coaxial with the tubular body 21 and connected to the latter through a circular plate 23. The cylindrical body 22 has a first circular edge 24a which approaches the building drum 10 when the auxiliary support member 16 is in engagement with the building drum 10.

The second outer circumferential surface 16a lies on the cylindrical body 22 and has non-stick circumferential portions 25', 25", 25''' and sticking circumferential portions 26', 26". Said non-stick circumferential portions 25', 25", 25''' and sticking portions 26', 26" have a cylindrical shape coaxial with the main axis "Y-Y".

In the embodiment shown not in a limiting sense, three non-stick circumferential portions 25', 25", 25''' are disposed in side by side relationship and alternated along the axial extension of the auxiliary support member 16, with two sticking circumferential portions 26', 26".

Preferably, as shown, each of the second outer circumferential surfaces 16a has a first sticking circumferential portion 26' close to a first axial end 27 of the auxiliary support member 16 carrying the circular edge 24a and a second circumferential sticking portion 26" close to a second axial end 28 opposite to said first axial end 27.

Each of the second outer circumferential surfaces 16a further has a first non-stick circumferential portion 25' placed on the first axial end 27 of the auxiliary support member 16, a second non-stick circumferential portion 25" placed on the second axial end 28 of the auxiliary support member 16 and a third non-stick circumferential portion 25''' interposed between the first 26' and second 26" sticking circumferential portion.

The first non-stick circumferential portion 25' extends in an axial direction starting from the first circular edge 24a towards the second axial end 28 as far as the first sticking circumferential portion 26'. The first sticking circumferential portion 26' extends in an axial direction starting from the first non-stick circumferential portion 25' towards the second axial end 28 as far as the third non-stick circumferential portion 25'''. The third non-stick circumferential portion 25''' extends in an axial direction starting from the first sticking circumferential portion 26' towards the second axial end 28 as far as the second sticking circumferential portion 26". The second sticking circumferential portion 26" extends in an axial direction starting from the third non-stick circumferential portion 25''' towards the second axial end 28 as far as the second non-stick circumferential portion 25". The second non-stick circumferential portion 25" extends starting from the second sticking circumferential portion 26" as far as a second circular edge 24b lying on the second axial end 28 of the auxiliary support member 16.

Given the overall width "L" of the auxiliary support member 16, measured along a direction parallel to the main axis "Y-Y", the first non-stick circumferential portion 25' has an axial width "L1" included between about 5% and 15% of the overall axial width "L" of the auxiliary support member 16.

The first sticking circumferential portion 26' has an axial width "$L_2$" included between about 20% and 35% of said overall axial width "L" of the auxiliary support member 16.

The second sticking circumferential portion 26" has an axial width "$L_3$" included between about 5% and 15% of the overall axial width "L" of the auxiliary support member 16.

The second non-stick circumferential portion 25" has an axial width "$L_4$" smaller than or equal to about 35% of the overall axial width "L" of the auxiliary support member 16. The second non-stick circumferential portion 25" therefore can also be absent.

Each of the non-stick circumferential portions 25', 25", 25''' must enable relative sliding of the carcass sleeve components of the tyre under processing substantially without offering any resistance.

Preferably, this result is obtained by laying a non-stick coating (containing Teflon®, for example) on the cylindrical body 22, preferably using the known plasma-coating technique.

Following laying of the coating, the non-stick circumferential portions 25', 25", 25''' preferably have a roughness "Ra" smaller than or equal to about 12 Each of the sticking circumferential portions 26', 26" must allow the elementary components to be stuck and maintained in place during the starting steps of laying the same on the auxiliary support members 16.

To this aim, these sticking circumferential portions 26', 26" preferably have a roughness "Ra" included between about 12 μm and about 15 μm.

The sticking portions 26', 26" are submitted to mechanical machining operations alone without any added material being laid or with laying of added material having mechanical surface features substantially identical (roughness, porosity, hardness) with those of the base surface.

In a preferred embodiment, one or more layers of metal material are added on the whole radially external surface of the cylindrical body 22. These layers have a dual function: ensuring the intimate adhesion of a final non-stick added coating, of Teflon® for example, on the non-stick circumferential portions 25', 25", 25'''; and offering the desired "adhesiveness" of the sticking circumferential portions 26', 26".

By laying the metal material layers on the non-stick circumferential portions 25', 25", 25''' as well, it is also possible to limit the thickness "s" of the step (FIG. 3a) that is formed between a non-stick circumferential portion 25', 25", 25''' and an adjacent sticking circumferential portion 26', 26" to values lower than 50 μm. Preferably, this thickness is included between about 5 μm and about 20 μm.

As shown in FIGS. 1, 3, 5 and 6, a starting end of the continuous elongated element is first stuck to the first sticking circumferential portion 26', which continuous elongated element is subsequently laid in the form of coils disposed in side by side relationship or at least partly radially superposed, to form the abrasion-proof element 19.

As shown in FIG. 4, before laying the abrasion-proof element 19, a starting end of the strip-like element is stuck to the first sticking circumferential portion, which strip-like element is then wound up to form the square-woven fabric 20.

As shown in FIGS. 1, 3, 4, 5 and 6, stuck to the second sticking circumferential portion 26" are the end flaps 3a of the strip-like elements disposed transverse to the circumferential extension of the first outer circumferential surface 14 and designed to form the carcass ply/plies 3.

When formation of the carcass ply/plies 3 has been completed, the auxiliary support members 16 are disengaged from the respective connecting members 17. This disengagement can be for example obtained with the aid of the aforesaid outer handling device, by an action involving axial moving apart from the respective halves 10a of the building drum 10 so as to remove the second outer circumferential surfaces 16a from the abrasion-proof element 19, and/or liner 4, and/or square-woven fabric 20 and/or carcass ply/plies 3.

When disengagement is over, the auxiliary support members 16 can remain in engagement with the outer handling device, ready for being used again in a new working cycle.

During disengagement, a moving-apart force depending on the tyre size and type is applied to each of said auxiliary support members 16. This force is included between about 10 kg and about 150 kg and in any case is preferably lower than 100 kg.

Removal of the auxiliary support members 16 makes it possible, after possible transfer of the building drum 10 to another working unit, to fold down the end flaps 3a of the carcass ply/plies 3 applied around the building drum, towards the geometric axis "X-X" of the building drum itself, for instance with the aid of rollers or other devices not shown as they can be made in any convenient manner.

Locating members, not shown as they can be made in known manner, carry out fitting of each of the annular anchoring structures 5 coaxially around one of the end flaps 3a of the carcass ply/plies 3 folded down towards the geometric axis "X-X", locating it in axial abutment relationship against the corresponding half of the building drum 10 (FIG. 5).

When the locating operation has been completed, turning-up members, not shown, turn up each of the end flaps 3a around the respective annular anchoring structure 5, so as to stabilise engagement of same with the carcass ply/plies 3 giving rise to formation of said carcass sleeve.

When engagement of the annular anchoring structures 5 is over or concurrently with this operating step, application of at least one portion of the sidewalls 9 can be carried out.

The building drum 10 carrying the carcass sleeve is then preferably transferred to a location 29 (FIG. 6) external to the building station 19, for receiving and engaging an outer sleeve 30 integrating the belt structure 7, preferably already coupled to the tread band 8.

The outer sleeve 30 having an inner diameter "D2" greater than the winding diameter "D1", can be prepared in advance by formation or winding of one or more belt layers adapted to make the belt structure 7 on an auxiliary drum (not shown), and subsequent winding of the tread band 8 on the belt structure 7 carried by the auxiliary drum. More particularly, building of the tread band 8 can be carried out by feeding means supplying a continuous elongated element of elastomeric material that is applied, in the form of coils disposed in side by side relationship and/or at least partly radially superposed, onto the belt structure 7 carried by the auxiliary drum, while the latter is being driven in rotation. According to an alternative embodiment, at the end at least one portion of the sidewalls 9 can be build on the outer sleeve 30.

The outer sleeve 30 thus formed is adapted to be removed from the auxiliary drum, for instance by means of a transfer ring 31 or other suitable devices that will then dispose it to a coaxially centred position around the carcass sleeve carried by the building drum 10.

Then, shaping devices act on the building drum 10 to shape the carcass sleeve into a toroidal configuration, so as to cause application of same against a radially internal surface of the outer sleeve 30.

The shaping devices can for instance comprise said actuator (not shown) designed to drive the threaded bar 12 in rotation to cause mutual axial approaching of halves 10a of the drum and, consequently, of the annular anchoring structures 5 of the carcass sleeve. Preferably, the shaping devices further comprise inflating members, not shown, adapted to feed a working fluid into the carcass sleeve and cause radial expansion thereof by inflation, during mutual approaching of the annular anchoring structures 5.

Then at least one auxiliary shaping member 32 (only diagrammatically shown in FIG. 6) is preferably engaged to the building drum 10, which auxiliary member is suitable for being integrated with the shaping devices to enable the shaping step of the carcass sleeve to be carried out.

When the shaping step has been completed, the building drum 10 can be possibly transferred to at least one additional working station (not shown).

At the end of building, tyre 2 can be removed from the building drum 10 after disengagement of the auxiliary shaping members 32 and radial contraction of said drum, to be submitted to a vulcanisation and moulding step to be carried out in any convenient manner.

The invention claimed is:

1. An apparatus for building a tyre for a vehicle wheel, comprising:
   a building drum having at least one first outer circumferential surface; and
   at least one pair of auxiliary support members configured to be removably engaged with the building drum, each in axially approached relationship with a respective end of the building drum and having second outer circumferential surfaces extending in a continuation of said first outer circumferential surface for supporting at least one component of the tyre,
   wherein each of the second outer circumferential surfaces has a plurality of non-stick circumferential portions and a plurality of sticking circumferential portions, the non-stick and sticking portions arranged in an alternating manner along the axial extension of each auxiliary support member and comprising a first sticking circumferential portion having an axial width of between about 20% and about 35% of an overall axial width of one of said auxiliary support members.

2. The apparatus as claimed in claim 1, wherein said first sticking circumferential portion is positioned near a first axial end of the auxiliary support member.

3. The apparatus as claimed in claim 2, wherein each of the second outer circumferential surfaces has a second sticking circumferential portion near a second axial end of the auxiliary support member opposite said first axial end.

4. The apparatus as claimed in claim 3, wherein each of the second outer circumferential surfaces has a first non-stick circumferential portion placed on a first axial end of the auxiliary support member.

5. The apparatus as claimed in claim 4, wherein each of the second outer circumferential surfaces has a second non-stick circumferential portion placed on a second axial end of the auxiliary support member opposite the first axial end.

6. The apparatus as claimed in claim 5, wherein the first sticking circumferential portion and second sticking circumferential portion are separated by a third non-stick circumferential portion.

7. The apparatus as claimed in claim 3, wherein the second sticking circumferential portion has an axial width smaller than or equal to about 15% of an overall axial width of the auxiliary support member.

8. The apparatus as claimed in claim 3, wherein the second sticking circumferential portion has an axial width greater than or equal to about 5% of an overall axial width of the auxiliary support member.

9. The apparatus as claimed in claim 4, wherein the first non-stick circumferential portion has an axial width smaller than or equal to about 15% of an overall axial width of the auxiliary support member.

10. The apparatus as claimed in claim 4, wherein the first non-stick circumferential portion has an axial width greater than or equal to about 5% of an overall axial width of the auxiliary support member.

11. The apparatus as claimed in claim 5, wherein the second non-stick circumferential portion has an axial width smaller than or equal to about 35% of an overall axial width of the auxiliary support member.

12. The apparatus as claimed in claim 1, wherein said plurality of non-stick circumferential portions have a roughness smaller than or equal to about 12 μm.

13. The apparatus as claimed in claim 1, wherein said plurality of non-stick circumferential portions comprise a non-stick coating obtained by plasma coating.

14. The apparatus as claimed in claim 1, wherein said plurality of sticking circumferential portions have a roughness greater than or equal to about 12 μm.

15. The apparatus as claimed in claim 1, wherein said plurality of sticking circumferential portions have a roughness smaller than or equal to about 15 μm.

16. The apparatus as claimed in claim 1, wherein at least one of said plurality of non-stick circumferential portions and at least one of said plurality of sticking circumferential portions define a step therebetween, the thickness of which is between about 5 μm and about 50 μm.

17. The apparatus as claimed in the claim 16, wherein said thickness is less than or equal to about 20 μm.

* * * * *